(12) United States Patent
Nozaki et al.

(10) Patent No.: US 7,202,289 B2
(45) Date of Patent: Apr. 10, 2007

(54) BIODEGRADABLE RESIN COMPOSITION, FILLER THEREFOR AND MOLDED ARTICLE THEREOF

(75) Inventors: Koji Nozaki, Kawasaki (JP); Takahisa Namiki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 252 days.

(21) Appl. No.: 10/629,611

(22) Filed: Jul. 30, 2003

(65) Prior Publication Data

US 2004/0034121 A1 Feb. 19, 2004

(30) Foreign Application Priority Data

Aug. 13, 2002 (JP) .............................. 2002-235711

(51) Int. Cl.
C08K 9/10 (2006.01)
(52) U.S. Cl. ...................... 523/449; 524/27; 524/451; 523/124; 523/126; 523/205
(58) Field of Classification Search ............... 524/449, 524/451, 27; 523/124, 126, 205
See application file for complete search history.

(56) References Cited

U.S. PATENT DOCUMENTS

| 3,971,753 | A | * | 7/1976 | Frechtling et al. | ........... 524/789 |
| 5,180,765 | A | | 1/1993 | Sinclair | |
| 5,196,473 | A | | 3/1993 | Valenta et al. | |
| 5,545,485 | A | * | 8/1996 | Hashitani et al. | ........ 428/423.1 |
| 5,702,787 | A | * | 12/1997 | Andersen et al. | ........... 428/36.4 |
| 5,849,401 | A | * | 12/1998 | El-Afandi et al. | ........... 428/215 |
| 6,231,970 | B1 | * | 5/2001 | Andersen et al. | ........... 428/332 |
| 6,350,530 | B1 | | 2/2002 | Morikawa et al. | |
| 6,890,546 | B2 | * | 5/2005 | Mollison et al. | ............. 424/430 |
| 2001/0003761 | A1 | | 6/2001 | Ishibashi et al. | ............. 524/425 |
| 2004/0034141 | A1 | | 2/2004 | Aramaki et al. | |

FOREIGN PATENT DOCUMENTS

| EP | 1 097 967 | 5/2001 |
| EP | 1 146 075 | 10/2001 |
| JP | 04-318042 A | 11/1992 |
| JP | 4-335060 | 11/1992 |
| JP | 07-133435 A | 5/1995 |
| JP | 8-199052 | 8/1996 |
| JP | 8-283557 | 10/1996 |
| JP | 9-137047 | 5/1997 |
| JP | 10-059466 A | 3/1998 |
| JP | 11-172091 | 6/1999 |
| JP | 11-323141 | 11/1999 |
| JP | 2000-319532 | 11/2000 |
| JP | 2001-335623 | 12/2001 |
| JP | 2002-167497 | 6/2002 |

OTHER PUBLICATIONS

Benedicte Lepoittevin[a,b], et al., Polymer/layered Silicate Nanocomposites by Combined Intercalative Polymerization and Melt Intercalation: A Masterbatch Process; Mar. 2003; pp. 2033-2040.
MerckSafety Data Sheet According to EC Directive 91/155/EEC (P. 1-5 Date of Issue: May 9, 2004.
Walter De Gruyter, Anorganische Chemie 2; verbesserte Auflage; Berlin, New York 1990; pp. 428-429.
Patent Office Communications dated Aug. 5, 2005, European Patent Office.
Patent Office Communications dated Sep. 5, 2005, European Patent Office.
Jürgen Falbe, Manfred Regitz: "Römpp Chemie Lexikon" 1991, p. 3386-3388, Georg Thieme Verlag, Stuttgart New York.
Walter De Gruyter, Erwin, Riedel, Anorganische Chemie 2; verbesserte Auflage; Berlin, New York 1990; pp. 428-429.
Jürgen Falbe, Manfred Regitz; "Römpp Chemie Lexikon" 1991, p. 3386-3389, Georg Thieme Verlag, Stuttgart New York.

* cited by examiner

*Primary Examiner*—Kriellion Sanders
(74) *Attorney, Agent, or Firm*—Westerman, Hattori, Daniels & Adrian, LLP.

(57) ABSTRACT

The present invention is a biodegradable resin composition having excellent physical properties such as strength, water-resistance, molding workability, thermal-resistance, and suitable for a molded article for various electric products. The biodegradable resin composition of the present invention contains a biodegradable resin and filler coated with a biodegradable coating resin in which the filler coated with the biodegradable coating resin is contained within the biodegradable resin. Preferable aspects are such as an aspect that the filler is at least one of mica, talc and montmorillonite, an aspect that a filler content of the biodegradable resin is in the range of 5 mass % to 50 mass %, an aspect that an average diameter of the filler is in the range of 0.01 μm to 200 μm, and an aspect that the biodegradable resin is polylactic acid.

18 Claims, No Drawings

BIODEGRADABLE RESIN COMPOSITION, FILLER THEREFOR AND MOLDED ARTICLE THEREOF

CROSS-REFERENCE TO RELATED APPLICATION

This application is based upon and claims the benefit of priority from the prior Japanese Patent Application No. 2002-235711, filed on Aug. 13, 2002, the entire contents of which are incorporated herein by reference.

BACKGROUND OF THE INVENTION

1. Field of the Invention

The present invention relates to a biodegradable resin composition, which has similar properties as that of conventional plastics, but upon disposal, is decomposable by ordinary microorganisms existing in the environment. The present invention also relates to a filler for a biodegradable resin composition, which is suitably used for the biodegradable resin composition of the present invention, and has an excellent decomposability. Further, the present invention relates to a molded article formed of the biodegradable resin composition of the present invention, which is suitably used as a housing and the like for various electric products, and is easily disposable without causing any environmental pollutions.

2. Description of the Related Art

Conventionally, resin compositions are used for various electric products as housings thereof and the like. However, the resin compositions damage incinerators by the heat generated during combustion, and discharge toxic gases such as dioxin and the like, when they are combusted for disposal. Moreover, the resin compositions are hardly decomposed when they are buried in the soil. The resin compositions hence have problems in that they cannot be easily disposed and they may cause environmental pollutions.

In April 2001, the "Home Appliance Recycling law" was enacted. Due to this law, large electric products, such as TV (television) and the like, have been recovered upon disposal. However, the collected large electric products are rarely reused. Further, most large electric products are still disposed as incombustible wastes because there is no legal punishment to the offender by the above-mentioned law. In the case of small electric products, the number of sales is much larger than that of the large electric products, so that an enormous amount of incombustible waste are generated as a result. Accordingly, disposal of electric products, regardless of large or small, has become a serious social problem.

Recently, biodegradable resins have been focused as the solution of the above-mentioned problem. The term, "biodegradable resins" refers to the resins which are decomposed into low molecular weight compounds after disposal, and in the end, decomposed to water and carbon dioxide, by microorganisms in the environment (Biodegradable Plastics Society, ISO/TC-207/SC3). The biodegradable resins are roughly distinguished into three types: one having aliphatic polyester resin in a molecular skeleton thereof; one having polyvinyl alcohol; and one having polysaccharides. For their utilization, the biodegradable resins have been developed to realize mainly disposable products, such as materials for agriculture, forestry and marine industry (e.g., films, plant pots, fish lines and fish nets), materials for civil engineering work (e.g., water-holding sheets, plant nets and the like), packages and containers (e.g., those that are difficult to recycle due to soils, foods and the like attached thereto) and the like.

As has been mentioned above, use of the biodegradable resin for a resin composition enables disposal into the soil and the like, and remarkably reduced possible hazard to the environment.

In the case that the biodegradable resins are utilized for molding articles of electric products such as housings, structural materials and the like, however, the biodegradable resins themselves do not have desirable physical properties for the electric products, namely excellent physical properties such as strength, thermal resistance, flame retardancy and the like. For example, aliphatic polyester resins, one type of biodegradable resins, have glass transition temperature (Tg: the temperature where storage elastic modulus is reduced in about 1/10 to 1/100 relative to the storage elastic modulus at ordinary temperature) of approximately 60° C., the storage elastic modulus is therefore rapidly reduced to approximately $1\times10^7$ Pa at the temperature above 60° C., from the storage elastic modulus of $1\times10^9$ Pa at ordinary temperature. Accordingly, deformations of aliphatic polyester resins tend to easily occur above 60° C. Owing to this reason, single use of aliphatic polyester resins for housings of electric products is not acceptable.

A resin composition is therefore desired that provides excellent physical properties to conventional plastics, for example, strength, water-resistance, molding workability and flame retardancy during use, rapid decomposability by ordinary microorganisms existed in the environment after disposal, and suitability for molding articles of various electric products and the like.

SUMMARY OF THE INVENTION

An object of the present invention is to provide a biodegradable resin composition which has excellent physical properties such as strength, water-resistance, molding workability, thermal resistance and the like, and is able to be rapidly decomposed by ordinary microorganisms existing in the environment after disposal, and is suitably used as a material of molded articles for various electric products.

Another object of the present invention is to provide a filler for a biodegradable resin composition which is suitably used for the biodegradable resin composition of the present invention and has excellent dispersibility. A further object of the present invention is to provide a molded article which is suitably used as a housing of various electric products and enables simple disposal without causing any environmental pollution.

The biodegradable resin composition of the present invention comprises a biodegradable resin and a filler coated with a biodegradable coating resin, in which the filler coated with the biodegradable coating resin is contained within the biodegradable resin so as to form the biodegradable resin composition.

The filler for a biodegradable resin composition of the present invention comprises a filler and a biodegradable coating resin, in which the filler is coated with the biodegradable coating resin.

The molded article of the present invention is formed of the biodegradable resin composition of the present invention.

DESCRIPTION OF THE PREFERRED EMBODIMENTS (Biodegradable Resin Composition and Filler for a Biodegradable Resin Composition)

The biodegradable resin composition of the present invention contains a biodegradable resin and a filler coated with a biodegradable coating resin. In the biodegradable resin composition of the present invention, the biodegradable resin and the biodegradable coating resin may be identical or different types of resins. If needed, the biodegradable resin composition of the present invention may further contain another component depending on the intended purpose.

The filler for a biodegradable resin composition of the present invention is the filler coated with a biodegradable coating resin, which is contained within the biodegradable resin composition of the present invention as mentioned above. Accordingly, the filler for a biodegradable resin composition will be explained together with the biodegradable resin composition hereinafter.

-Biodegradable Resin-

As the biodegradable resin, any biodegradable resin in the art can be selected depending on the intended purpose, without any limitation. Examples of the biodegradable resin include natural orientated biodegradable resins, chemically synthesized biodegradable resins and other types of biodegradable resins.

Examples of the natural orientated biodegradable resins include chitin-chitosan, alginic acid, gluten, collagen, polyaminoacid, bacteria cellulose, pullulan, curdlan, polysaccharide by-product and the like. These may be used singly, or in combination of two or more.

Examples of the chemically synthesized biodegradable resins include aliphatic polyester, aliphatic aromatic polyester, polyvinyl alcohol (PVA), polyurethane (PU), a blended resin of synthesized biodegradable resin and natural orientated biodegradable resin, and the like.

Examples of aliphatic polyester are polyhydroxybutyrate (PHB) ($-OCH_2CH_2CH_2CO-$)$_n$, polycaprolacton (PCL) [$C_6H_{10}O_2$]$_n$, polybutylene succinate (PBS) ($-COCH_2CH_2COO(CH_2)_4O-$)$_n$, polybutylene succinate/adipate (PBSA) ($-O(CH_2)_4OCO(CH_2)aCO-$)$_n$ (where, a=2, 4), polyethylene succinate (PES) ($-O(CH_2)_4OCO(CH_2)_2CO-$)$_n$, polyglycolic acid (PGA), polylactic acid (PLA) [$C_3H_4O_2$]$_n$, derivatives thereof, copolymers of monomers thereof, and the like.

An example of the blended resin of synthesized biodegradable resin and natural orientated biodegradable resin is a resin having starch as a base material.

Examples of other types of biodegradable resins include aliphatic polyester-carbonate copolymer, aliphatic polyester-polyamide copolymer, and the like.

Among the above-listed biodegradable resins, chemically systemized resins are preferable. Of these, aliphatic polyester is more preferable in terms of excellent molding workability, thermal resistance, impact resistance and the like thereof. Furthermore, polyesters having hydroxycarboxylic acid as a monomer unit are even more preferable, and polylactic acid is particularly preferably thereamong.

Examples of polyester having hydroxycarboxylic acid as a monomer unit are polymers of oxy acid such as lactic acid, malic acid, glycolic acid and the like, copolymers thereof, and the like.

The manufacturing method of the polyester having hydroxycarboxylic acid as a monomer unit is not particularly limited and can be selected depending on the intended purpose. Examples thereof include a lactide method in which ring-opening polymerization is carried out between lactide of cyclic diester and corresponding lactones, lactic acid direct dehydration condensation method, and the like. In addition, as a catalyst used during manufacturing procedure, tin, antimony, zinc, titanium, iron, an aluminum compound and the like may be included as examples. These may be used singly, or in combination of two or more. Of these, tin and an aluminum compound are preferable, and octyltin acid, aluminum acetyl acetate are particularly preferable.

In the case that two or more types of biodegradable resins are contained in the present invention, a combination of polylactic acid and one of polycaprolacton, polyhydroxybutyrate and polybutylene succinate, is preferable.

-Filler-

The filler is not particularly limited and can be selected depending on the intended purpose. Examples of the filler include aluminum hydroxide, aluminum, calcium carbonate, calcium silicate, kaolin, mica, molybdenum disulfide, talc, montmorillonite, graphite, carbon black, metal oxides such as magnesium oxide, titanium oxide, silica oxide, and the like.

These may be used singly or in combination of two or more. Of those above-listed fillers, mica, talc and montmorillonite are preferable in terms of cost effectiveness, availability, physical strength and the like.

The filler content of the biodegradable resin composition is preferably within the range of about 5% by mass to about 50% by mass, more preferably within the range of 5% by mass to 30% by mass, and even more preferably within the range of 10% by mass to 20% by mass.

The filler content is preferably about 5% by mass or more in terms of physical strength of the biodegradable resin composition, and preferably about 30% or less in terms of biodegradability of the biodegradable resin composition.

The average particle diameter of the filler is preferably within the range of about 0.01 μm to about 200 μm, and more preferably within the range of 1 μm to 50 μm.

Moreover, the filler is preferably as fine a particle as possible and having a narrow particle size distribution in terms of development of dispersibility.

In the present invention, the filler is coated with a biodegradable coating resin, and the filler coated with the biodegradable coating resin is then contained within the biodegradable resin so as to prepare the biodegradable resin composition.

The filler coated with the biodegradable coating resin is the filler for a biodegradable resin composition of the present invention.

The filler for a biodegradable resin composition of the present invention is not particularly limited to conditions such as coating amount of the biodegradable coating resin on the filler, coating area and the like, and can be selected depending on the intended purpose.

In the case that the filler for a biodegradable resin composition of the present invention is contained within the biodegradable resin composition, it is preferable that the biodegradable coating resin of the filler and the biodegradable resin in the biodegradable resin composition are the identical type of resins, from the viewpoint that the dispersibility of the filler to a biodegradable resin composition is improved in the biodegradable resin so that the resulting biodegradable resin composition improves bending modulus thereof. Moreover, it is more preferable that a biodegradable coating resin of the filler and a biodegradable resin in the biodegradable resin composition are the identical resins so that the above-mentioned improvement becomes outstanding.

The filler for a biodegradable resin composition of the present invention is particularly suitable for the biodegradable resin composition of the present invention.

-Flame Retardant-

The biodegradable resin composition of the present invention may further comprise a flame retardant.

The flame retardant is not particularly limited, and can be selected depending on the intended purpose. Examples of the flame retardant include a silicone compound, metal salt, metal salt hydroxide, a phosphorus compound, and the like. These may be used singly or in combination of two or more.

The flame retardant content of the biodegradable resin composition is not limited and can be adjusted depending on the types and contents of the biodegradable resin, the filler and the like.

-Fibrous Component-

The biodegradable resin composition of the present invention may further comprise a fibrous component.

The fibrous component is not limited and can be selected depending on the intended purpose. Examples of the fibrous component include hemp, chitin-chitosan, palm fiber, short fiber or powder derived therefrom, asbestos, carbon fiber, glass fiber, cellulose, α-cellulose, cotton, nylon, aurone, rayon and the like.

These may be used singly or in combination of two or more. Of these, hemp, chitin-chitosan, palm fiber, and short fiber or powder derived therefrom are preferable in terms of the natural orientated nature thereof and biodegradability. Glass fiber and carbon fiber are also preferable in terms of the improvement of bending modulus.

The fibrous component content of the biodegradable resin composition is not particularly limited, and can be adjusted depending on the types and contents of the biodegradable resin, the filler and the like.

-Additive-

The biodegradable resin composition of the present invention may include the additive depending on the intended purpose.

Example of the additive include carboxylic acid which is a terminal functional group of polyester resin, and compounds which are reactive to hydroxide group such as a carbodiimide compound, an isocyanate compound, an oxazoline compound and the like. These are added in order to inhibit hydrolysis of the biodegradable resin. The biodegradable resin composition may further include, for example, a weather-proof agent, an antioxidant, thermostabilizer, UV absorbent, plasticizer, nucleating agent, lubricant, mold releasing agent, colorant, compatibilizer and the like.

The biodegradable resin composition of the present invention is suitably used in various fields, and is particularly suitably used for various molded articles, for example, a housing of electric product.

-Molded Article-

The molded article of the present invention is not particularly limited as long as it is formed of the biodegradable resin composition of the present invention. Shape, structure, size, application thereof, and the like can be adjusted depending on the intended purpose.

The molding method of the molded article is not particularly limited, and can be selected depending on the intended purpose. Of those, injection molding is preferable as the crystallinity of polylactic acid is increased and physical strength is improved as a result. As conditions of the injection molding, it is preferable to maintain the temperature of metal mold at 90° C. to 100° C. for 30 seconds to 5 minutes.

The molded article of the present invention is suitably used in various fields. For example, the molded article of the present invention is particularly suitable for a housing of electric products.

Concrete examples of the present invention will be precisely described hereinafter. However, the present invention is not limited thereto.

EXAMPLE 1

Preparation of Biodegradable Resin Composition

Biodegradable resin compositions E to G, and L to N of the present invention, and biodegradable resin compositions A to D, and H to K of comparative examples were prepared and evaluated with bending modulus. The results were shown in Table 1.

For the preparation, polylactic acid (LACEA H-100J, manufactured by Mitsui Chemicals, Inc.) was used as a biodegradable resin. Moreover, the filler content of biodegradable resin compositions were adjusted so as to equal in each compounds. In Table 1, "%" refers "% by mass", alphabets such as "A" express each biodegradable compound such as "biodegradable resin composition A", "polybutylene succinate" is "BIONOLLE, manufactured by Showa Highpolymer Co., Ltd.", "mica" is "A-21 manufactured by Yamaguchi Mica Co., Ltd." and "talc" is "talc manufactured by Hayashi Limited". Further, fillers in the biodegradable resin compositions E to G and L to N were coated with polylactic acid.

TABLE 1

| | Resin | Filler | Bending Modulus (GPa) |
|---|---|---|---|
| A | polylactic acid | — | 3.70 |
| B | polylactic acid | mica (30% added) | 8.00 |
| C | polylactic acid | talc (30% added) | 6.70 |
| D | polylactic acid | monmorillonite (30% added) | 5.30 |
| E | polylactic acid | mica (40% added, polylactic acid coating) | 10.00 |
| F | polylactic acid | talc (40% added, polylactic acid coating) | 8.10 |
| G | polylactic acid | monmorillonite (40% added, polylactic acid coating) | 6.30 |
| H | polylactic acid + polybutylene succinate (1:1) | — | 1.96 |
| I | polylactic acid + polybutylene succinate (1:1) | mica (30% added) | 5.60 |
| J | polylactic acid + polybutylene succinate (1:1) | talc (30% added) | 4.30 |
| K | polylactic acid + polybutylene succinate (1:1) | monmorillonite (30% added) | 3.30 |
| L | polylactic acid + polybutylene succinate (1:1) | mica (40% added, polylactic acid coating) | 7.20 |
| M | polylactic acid + polybutylene succinate (1:1) | talc (40% added, polylactic acid coating) | 5.70 |
| N | polylactic acid + polybutylene succinate (1:1) | monmorillonite (40% added, polylactic acid coating) | 4.00 |

As shown in Table 1, mica, talc and montmorillonite coated with the biodegradable resins, namely the biodegradable resin compositions of the present invention having the fillers for a biodegradable resin composition of the present invention, showed satisfactory dispersibility in the biodegradable resin compositions and significantly improved bending modulus of the biodegradable resin compositions, compared with conventional fillings such as mica, talc and montmorillonite without coating of the biodegradable resin.

EXAMPLE 2

The biodegradable resin compositions E to G which obtained excellent bending modulus in Example 1, and compound A of comparative example in Example 1 were again prepared and each of glass fiber (CS-3PE941, manufactured by Nitto Boseki Co., Ltd.) and carbon fiber (TR-06U, manufactured by Mitsubishi Rayon Co., Ltd) was added thereto, then they were evaluated with bending modulus. The results thereof were shown in Table 2. In Table 2, "%" refers "% by mass".

TABLE 2

| | Fabrious Component (20%) | Bending Modulus (Gpa) |
|---|---|---|
| A | glass fibre | 6.8 |
| E | glass fibre | 12.8 |
| F | glass fibre | 10.1 |
| G | glass fibre | 8.9 |
| A | carbon fibre | 14.7 |
| E | carbon fibre | 18.8 |
| F | carbon fibre | 16.3 |
| G | carbon fibre | 15.0 |

As shown in Table 2, it was found that the biodegradable resin compositions of the present invention were able to significantly improve bending modulus thereof by adding either glass fiber or carbon fiber.

EXAMPLE 3

Biodegradable resin compositions E to G which obtained excellent bending modulus in Example 1, and biodegradable resin composition A of comparative example in Example 1 were again prepared and a flame retardant was added. Silicone compound (DC4-7-81, manufactured by Dow Corning Toray Silicone Co., Ltd.), magnesium hydroxide and red phosphorous were used as the flame retardant. Then biodegradable resin compositions E to G and biodegradable resin composition A were evaluated the flame retardancy. Flame retardancy was measured by monitoring conditions of after separating from flame, and ignition condition to pieces of gauze. Test pieces were prepared in the size of 12.7× 12.7×3.1 mm by a making machine. In Table 3, "%" refers "% by mass".

The conditions of the biodegradable resin compositions after separating from flame were evaluated as follow. In Table 3, "Keep burning" means the condition of being flaming or glowing, and "Quenched" means the condition of being completely extinguished.

The ignition condition of the biodegradable resin compositions to a piece of gauze were evaluated as follow. In Table 3, "Lighting up" means the condition that the gauze started, and "Not lighting up" means the condition that the gauze did not start burning.

TABLE 3

| | Flame retardant | After spareting from flame | Ignition of gauze |
|---|---|---|---|
| A | — | keep burning | lighting up |
| A | silicon compound (5%) | keep burning | lighting up |
| E | silicon compound (5%) | quenched | not lighting up |
| E | magunium hydroxide (30%) | quenched | not lighting up |
| E | red phosphorous (10%) | quenched | not lighting up |
| F | silicon compound (5%) | quenched | not lighting up |
| F | magunium hydroxide (30%) | quenched | not lighting up |
| F | red phosphorous (10%) | quenched | not lighting up |
| G | silicon compound (5%) | quenched | not lighting up |
| G | magunium hydroxide (30%) | quenched | not lighting up |
| G | red phosphorous (10%) | quenched | not lighting up |

As shown in Table 3, by adding the flame retardant, the biodegradable resin compositions of the present invention were able to improve flame retardancy without deteriorating other properties.

As can be seen above, the present invention is able to overcome conventional problems of biodegradable resins, and provide a biodegradable resin composition which has excellent physical properties such as strength, water-resistance, molding workability and thermal resistance, is able to be decomposed by ordinary microorganisms existing in the environment, and is suitably used for a molding article of various electric products. The present invention is also able to provide a filler for biodegradable resin composition which is suitable for the biodegradable resin composition of the present invention, and has excellent dispersibility. Furthermore, the present invention is able to provide a molded article, which is suitably used for a housing of electric products and the like, and enables simple disposal without causing any environmental pollution.

The invention claimed is:

1. A biodegradable resin composition comprising:
a biodegradable resin; and
a filler coated with a biodegradable coating resin,
wherein the biodegradable resin and the biodegradable coating resin are identical types of resins; and
the biodegradable resin and the biodegradable coating resin are an aliphatic polyester resin.

2. A biodegradable resin composition according to claim 1, wherein the biodegradable resin and the biodegradable coating resin are identical.

3. A biodegradable resin composition according to claim 1, wherein the filler is at least one of mica, talc and montmorillonite.

4. A biodegradable resin composition according to claim 1, wherein a content of the filler is 5% by weight to 50% by weight relative to the biodegradable resin composition.

5. A biodegradable resin composition according to claim 1, wherein an average particle diameter of the filler is within the range of 0.01 μm to 200 μm.

6. A biodegradable resin composition according to claim 1, wherein the aliphatic polyester resin is polyhydroxycarboxylic acid.

7. A biodegradable resin composition according to claim 6, wherein the polyhydroxycarboxylic acid is polylactic acid.

8. A biodegradable resin composition according to claim 1, wherein the biodegradable resin comprises two or more types of biodegradable resins.

9. A biodegradable resin composition according to claim 1, further comprising at least one type of flame retardant selected from silicone compound, metal salt, metal salt hydroxide and phosphorous compound.

10. A biodegradable resin composition according to claim 1, further comprising at least one type of fibrous component selected from hemp, chitin-chitosan, palm fiber and one of short fiber and powder derived therefrom.

11. A biodegradable resin composition according to claim 1, further comprising at least one type of fibrous component selected from glass fiber and carbon fiber.

12. A biodegradable resin composition according to claim 1, wherein the biodegradable resin comprises polylactic acid and one of polycaprolacton, polyhydroxybutyrate and polybutylene succinate.

13. A filler for a biodegradable resin composition, comprising:
    filler; and
    a biodegradable coating resin,
    wherein the filler is coated with the biodegradable coating resin;
    the biodegradable resin and the biodegradable coating resin are identical type of resins; and
    the biodegradable resin and the biodegradable coating resin are an aliphatic polyester resin.

14. A filler for a biodegradable resin composition according to claim 13, wherein the filler is at least one of mica, talc and montmorillonite.

15. A filler for a biodegradable resin composition according to claim 13, wherein an average particle diameter of the filler is within the range of 0.01 μm to 200 μm.

16. A filler for a biodegradable resin composition according to claim 13, wherein the aliphatic polyester resin is polyhydroxycarboxylic acid.

17. A molded article comprising, a biodegradable resin composition containing a biodegradable resin, and a filler coated with a biodegradable coating resin,
    wherein the biodegradable resin and the biodegradable coating resin are identical type of resins; and
    the biodegradable resin and the biodegradable coating resin are an aliphatic polyester resin.

18. A molded article according to claim 17, wherein the molded article is used for a housing of an electrical appliance.

* * * * *